US011562654B2

(12) United States Patent
Krawiec et al.

(10) Patent No.: US 11,562,654 B2
(45) Date of Patent: Jan. 24, 2023

(54) VTOL EMERGENCY LANDING SYSTEM AND METHOD

(71) Applicant: Rockwell Collins, Inc., Cedar Rapids, IA (US)

(72) Inventors: Bryan M. Krawiec, Ashburn, VA (US); Jack Jordan, Cedar Rapids, IA (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 273 days.

(21) Appl. No.: 17/077,019

(22) Filed: Oct. 22, 2020

(65) Prior Publication Data

US 2022/0130264 A1 Apr. 28, 2022

(51) Int. Cl.
*G08G 5/00* (2006.01)
*G05D 1/06* (2006.01)
(Continued)

(52) U.S. Cl.
CPC ......... *G08G 5/0056* (2013.01); *B64C 39/024* (2013.01); *G05D 1/0676* (2013.01);
(Continued)

(58) Field of Classification Search
CPC .. G08G 5/0056; G08G 5/0026; G08G 5/0039; G08G 5/0069; G08G 5/025;
(Continued)

(56) References Cited

U.S. PATENT DOCUMENTS

| 6,193,190 B1 * | 2/2001 | Nance | G05D 1/0676 244/114 R |
| 8,521,343 B2 | 8/2013 | Spinelli | |

(Continued)

FOREIGN PATENT DOCUMENTS

| WO | WO 2011/039666 A1 * | 4/2011 | ............ G06F 19/00 |
| WO | 2019116101 A1 | 6/2019 | |

OTHER PUBLICATIONS

Jourdan, D. B. et al., "Enhancing UAV Survivability Through Damage Tolerant Control", AIAA Guidance, Navigation, and Control Conference, Aug. 2-5, 2010, Toronto, Ontario Canada, pp. 1-26.

(Continued)

*Primary Examiner* — Elaine Gort
*Assistant Examiner* — Anthony M Gartrelle
(74) *Attorney, Agent, or Firm* — Kinney & Lange, P.A.

(57) ABSTRACT

A system and method for automated vertical takeoff and landing (VTOL) aircraft emergency landing is disclosed. The system receives a plurality of inputs from onboard modules including aircraft state, vehicle health, acceptable landing zone (LZ), emergency landing path, and 3D world model to prepare an emergency landing procedure when necessary. If functional onboard an unmanned VTOL aircraft, the vehicle health module determines an emergency landing requirement, the system commands a damage tolerant autopilot to perform the emergency procedure and automatically control the VTOL aircraft. If functional onboard a manned VTOL aircraft, an operator or the vehicle health module initiates the emergency landing. Regardless of initiation, the emergency landing system controls, or provides guidance for manned control of, the VTOL aircraft from the point of initiation through touchdown at a threat differentiated preferred LZ via failure-based flight control inputs for automatic landing, or autonomous autorotation entry, glide, and flare.

15 Claims, 6 Drawing Sheets

(51) Int. Cl.
  *B64C 39/02* (2006.01)
  *G07C 5/00* (2006.01)
  *G07C 5/08* (2006.01)
  *G08G 5/02* (2006.01)
  *G08G 5/04* (2006.01)

(52) U.S. Cl.
  CPC ........... *G05D 1/0688* (2019.05); *G07C 5/008* (2013.01); *G07C 5/0808* (2013.01); *G08G 5/0026* (2013.01); *G08G 5/0039* (2013.01); *G08G 5/0069* (2013.01); *G08G 5/025* (2013.01); *G08G 5/045* (2013.01); *B64C 2201/145* (2013.01); *B64C 2201/18* (2013.01)

(58) Field of Classification Search
  CPC .... G08G 5/045; G05D 1/0688; G05D 1/0676; B64C 39/024; B64C 2201/145; B64C 2201/18; G07C 5/008; G07C 5/0808
  See application file for complete search history.

(56) References Cited

U.S. PATENT DOCUMENTS

| | | | |
|---|---|---|---|
| 9,242,727 B1 | 1/2016 | Alvarez et al. | |
| 9,257,048 B1 | 2/2016 | Offer et al. | |
| 9,274,529 B2 | 3/2016 | Ben-Shachar et al. | |
| 9,376,218 B2 | 6/2016 | Al Fadhli | |
| 9,547,990 B2 | 1/2017 | Ling et al. | |
| 10,124,907 B1 | 11/2018 | Gavrilets et al. | |
| 10,223,925 B2 | 3/2019 | Cutler | |
| 10,403,153 B2 | 9/2019 | Glaab et al. | |
| 10,620,641 B2 | 4/2020 | Haskins et al. | |
| 2007/0164167 A1 | 6/2007 | Bachelder et al. | |
| 2011/0174925 A1 | 7/2011 | Ying | |
| 2011/0266809 A1 | 11/2011 | Calverley | |
| 2014/0316617 A1 | 10/2014 | Ali | |
| 2014/0343765 A1 | 11/2014 | Suiter et al. | |
| 2014/0379179 A1* | 12/2014 | Goossen | G05D 1/0684 701/16 |
| 2016/0093225 A1 | 3/2016 | Williams et al. | |
| 2016/0304190 A1 | 10/2016 | Grohmann et al. | |
| 2017/0243505 A1 | 8/2017 | Dimock | |
| 2018/0129226 A1 | 5/2018 | Rogers et al. | |
| 2018/0304993 A1 | 10/2018 | Offredi et al. | |
| 2018/0327091 A1* | 11/2018 | Burks | B64F 1/007 |
| 2018/0364707 A1 | 12/2018 | Bosworth et al. | |
| 2019/0009904 A1 | 1/2019 | Winkle et al. | |
| 2019/0088144 A1 | 3/2019 | Argo | |
| 2019/0094886 A1 | 3/2019 | Haskins et al. | |
| 2021/0082295 A1* | 3/2021 | Surace | G01S 13/913 |
| 2021/0191425 A1* | 6/2021 | Garhart | G05D 1/0676 |
| 2021/0197965 A1* | 7/2021 | Kunz | B64C 39/024 |
| 2021/0241639 A1* | 8/2021 | Cherepinsky | G08G 5/0021 |

OTHER PUBLICATIONS

Extended Search Report in European Application No. 21202241.2 dated Mar. 24, 2022, 11 pages.

* cited by examiner

Loss of Tail Rotor Emergency Procedures

| Flight Regime | Tail Rotor Scenario | Result of Tail Rotor Scenario | Flying Notes | Landing Notes | Landing Attitude | Desired Landing Wind |
|---|---|---|---|---|---|---|
| Hover | Loss of Thrust | Rapid Left Yaw | N/A | Cushion Landing with Collective | Level | N/A |
| FWD Flight | Loss of Thrust | Left Yaw | Will maintain straight and level flight at above 120-125 knots due to vertical and lateral tail fins | Shallow approach with Left Sideslip | Level | Right Crosswind |
| FWD Flight | Right Pedal jammed FWD | Right Yaw | N/A | Slow Speed to have high power demand | Level | Left Crosswind |
| FWD Flight | Left Pedal jammed FWD | Left Yaw | N/A | High Touchdown speed (60+ knots) | Level | Right Crosswind |
| Autorotation | Loss of Thrust | Right Yaw (50+ knots) Left Yaw (close to flare) Right Yaw when cushioning landing with collective | Will maintain heading at 75 KTS and a bank angle of 10-15 degrees left wing down | Collective pull to zero sideslip at touchdown | Level | Right Crosswind of 20-45 degrees |

VTOL EMERGENCY LANDING SYSTEM AND METHOD

CROSS-REFERENCE TO RELATED APPLICATIONS

The present application is related to U.S. Pat. No. 10,124,907 entitled Autorotation Guidance Command System, Device, and Method to Rockwell Collins, Inc. filed on Aug. 3, 2016 and issued on Nov. 13, 2018, the contents of which are herein incorporated by reference in their entirety.

BACKGROUND

A flight control systems (FCS) may be extensively utilized on vertical takeoff and landing (VTOL) vehicles to provide varying levels of stability augmentation. Simple systems like stability augmentation systems (SAS) may merely provide basic damping of the aircraft and therefore require pilots to essentially remain in complete control of the vehicle. Autopilots, on the other hand, may control the vehicle with full authority effectively allowing the vehicle to fly on its own with minimal guidance and oversight necessary from a pilot. While such systems have been effective for legacy or existing piloted operations, some operators have highlighted the need for future systems to facilitate increased levels of automation, reduced pilot workload, reduced crew operations, and advanced autonomy.

Many efforts in industry and academia have investigated various control methods for vehicles but many of these assume "fair weather conditions" (vehicle is undamaged or otherwise in a healthy state). Additionally, many currently fielded systems (both in mechanical and fly-by-wire settings) tend to have a fail-passive approach where an FCS disengages control and returns it to a pilot in dangerous situations. None of this can be relied upon in future systems. Potential future systems must be fail-active and appropriately respond to emergency situations with effective contingency actions.

Therefore, a need remains for a system and related method which may overcome these limitations and provide an automated emergency landing system that can provide reliable, automatic guidance and control to a safe landing zone in the event of reduced vehicle performance (e.g., damage, component failure, etc.)

SUMMARY

In one embodiment of the inventive concepts disclosed herein, a system for automated vertical takeoff and landing (VTOL) aircraft emergency landing may comprise a state data module onboard a VTOL aircraft having at least one rotor, the state data module configured to monitor an aircraft state input and an environmental input. The system may also include a vehicle health module onboard the VTOL aircraft, the vehicle health module configured to monitor an engine performance input and an aircraft performance input, the aircraft performance input including a damage assessment of the VTOL aircraft.

The system may also include an acceptable landing zone (LZ) module onboard the VTOL aircraft, the acceptable landing zone module including a flight management system (FMS) input, a LZ suitability input, and a threat level, and an emergency landing path generator onboard the VTOL aircraft, the emergency landing path generator configured at least to receive a preferred LZ and generate a path to the preferred LZ.

The system may further include a three-dimensional (3D) world model onboard the VTOL aircraft, the three-dimensional world model including a database of flight hazards and a flight director onboard the VTOL aircraft and operatively coupled with a damage tolerant autopilot.

For control, the system may include a controller onboard the VTOL aircraft and operatively coupled with each of the state data module, the vehicle health module, the acceptable landing zone module, the emergency path generator, the three-dimensional world model, the flight director, and the damage tolerant autopilot and a tangible, non-transitory memory onboard the VTOL aircraft and configured to communicate with the controller, the tangible, non-transitory memory having instructions stored therein that, in response to execution by the controller, cause the controller to carry out each function of the systems herein.

In function, the system may receive, from the state data module, the aircraft state input including a VTOL aircraft position, a VTOL aircraft altitude, a heading, a track, an attitude, an airspeed, a groundspeed, a weight, and a fuel state, each associated with the VTOL aircraft and receive, from the state data module, the environmental input including an altitude wind vector associated with the VTOL aircraft altitude, and a surface wind vector, each associated with the VTOL aircraft position. The system may also receive, from the vehicle health module, the engine performance input including one of: a normal thrust state, a reduced thrust state, and a zero-thrust state and receive, from the vehicle health module, the aircraft performance input including a normal control status, a partial control status, and a battle damage control status.

The system may continuously determine and update an LZ range, the LZ range a current glide range of the VTOL aircraft associated with the VTOL aircraft position and based on each of: the aircraft state input, the environmental input, the engine performance input, and the aircraft performance input. For safety, the system may receive, from the 3D world model, a 3D world model input including 1) an alternate LZ within the LZ range, the alternate LZ a non-airport LZ capable of accepting an emergency landing of the VTOL aircraft, and 2) a flight hazard, the flight hazard one of: an obstacle and a threat to the VTOL aircraft.

The system may further receive, from the acceptable LZ module, 1) the FMS input including an airport within the LZ range, and 2) the LZ suitability input including an airport characteristic of the airport and an LZ characteristic of the alternate LZ, and 3) the threat level associated with each of: the VTOL aircraft position, the airport within the LZ range, and the alternate LZ within the LZ range and continuously determine and update the acceptable LZ from one of: the alternate LZ and the airport based on: 1) the LZ range, 2) the FMS input, and 3) the LZ suitability input.

The system may then continuously determine and update, the preferred LZ from the acceptable LZ based on the threat level and LZ range associated with each of the acceptable LZ and continuously generate, via the emergency landing path generator, the path from the VTOL aircraft position to the preferred LZ based on: 1) the aircraft state input, 2) the environmental input, 3) the engine performance input, 4) the aircraft performance input, 5) the LZ suitability input, and 6) the 3D world model input, the path having a start point collocated with the VTOL aircraft position and a touchdown point associated with the preferred LZ, the path further including of: a glide segment, a glide speed, a glide angle of bank, an autorotation segment, a minimal time-to-land autoland segment.

The system may receive an immediate landing request from the vehicle health module and command the damage tolerant autopilot, upon response of the immediate landing request, to employ a plurality of failure based control inputs to maneuver the VTOL aircraft using an all axis closed loop control from the start point to the touchdown point via the path, the plurality of failure based control inputs based on the engine performance input and the aircraft performance input.

An additional embodiment of the inventive concepts disclosed herein may include a method for automated vertical takeoff and landing (VTOL) aircraft emergency landing. The method may comprise receiving, from a state data module onboard a VTOL aircraft having at least one rotor, an aircraft state input including a VTOL aircraft position, a VTOL aircraft altitude, a heading, a track, an attitude, an airspeed, a groundspeed, each associated with the VTOL aircraft and receiving, from the state data module, an environmental input including a surface wind magnitude and a surface wind direction, each associated with the VTOL aircraft position.

The method may also include receiving, from a vehicle health module onboard the VTOL aircraft, an engine performance input including one of: a normal thrust state, a reduced thrust state, and a zero-thrust state and receiving, from the vehicle health module, an aircraft performance input including a normal control status, a partial control status, and a battle damage control status.

The method may further include continuously determining and updating an LZ range, the LZ range a current glide range of the VTOL aircraft associated with the VTOL aircraft position and based on each of: the aircraft state input, the environmental input, the engine performance input, and the aircraft performance input and receiving, from a 3D world model onboard the VTOL aircraft, a 3D world model input including 1) an alternate LZ within the LZ range, the alternate LZ a non-airport LZ capable of accepting an emergency landing of the VTOL aircraft, and 2) a flight hazard, the flight hazard one of: an obstacle and a threat to the VTOL aircraft.

The method may include receiving, from an acceptable LZ module onboard the VTOL aircraft, 1) an FMS input including an airport within the LZ range, 2) an LZ suitability input including a) an airport characteristic of the airport and b) an LZ characteristic of the alternate LZ, and 3) a threat level associated with each of: the VTOL aircraft position, the airport within the LZ range, and the alternate LZ within the LZ range and continuously determining and updating an acceptable LZ from one of: the alternate LZ and the airport based on: 1) the LZ range, 2) the FMS input, and 3) the LZ suitability input.

The method may also include continuously determining and updating, a preferred LZ from the acceptable LZ based on the threat level associated with each of the acceptable LZ and continuously generating, via an emergency landing path generator onboard the VTOL aircraft, a path from the VTOL aircraft position to the preferred LZ based on: 1) the aircraft state input, 2) the environmental input, 3) the engine performance input, 4) the aircraft performance input, 5) the LZ suitability input, and 6) the 3D world model input, the path having a start point collocated with the VTOL aircraft position and a touchdown point associated with the preferred LZ, the path further including a glide segment, a glide speed, a glide angle of bank, an autorotation segment, minimal time-to-land autoland segment.

The method may further include receiving an immediate landing request from one of: an operator onboard the VTOL aircraft and the vehicle health module and commanding a damage tolerant autopilot, upon response of the immediate landing request, to employ a plurality of failure based control inputs to maneuver the VTOL aircraft using an all axis closed loop control from the start point to the touchdown point via the path, the plurality of failure based control inputs based on the engine performance input and the aircraft performance input.

It is to be understood that both the foregoing general description and the following detailed description are exemplary and explanatory only and are not necessarily restrictive of the inventive concepts as claimed. The accompanying drawings, which are incorporated in and constitute a part of the specification, illustrate embodiments of the inventive concepts and together with the general description, serve to explain the principles of the inventive concepts disclosed herein.

BRIEF DESCRIPTION OF THE DRAWINGS

Implementations of the inventive concepts disclosed herein may be better understood when consideration is given to the following detailed description thereof. Such description makes reference to the included drawings, which are not necessarily to scale, and in which some features may be exaggerated and some features may be omitted or may be represented schematically in the interest of clarity. Like reference numerals in the drawings may represent and refer to the same or similar element, feature, or function. In the drawings in which

FIG. 5 is a diagram of an exemplary failure procedure matrix in accordance with one embodiment of the inventive concepts disclosed herein.

DETAILED DESCRIPTION OF EXEMPLARY EMBODIMENTS

Figure 1:
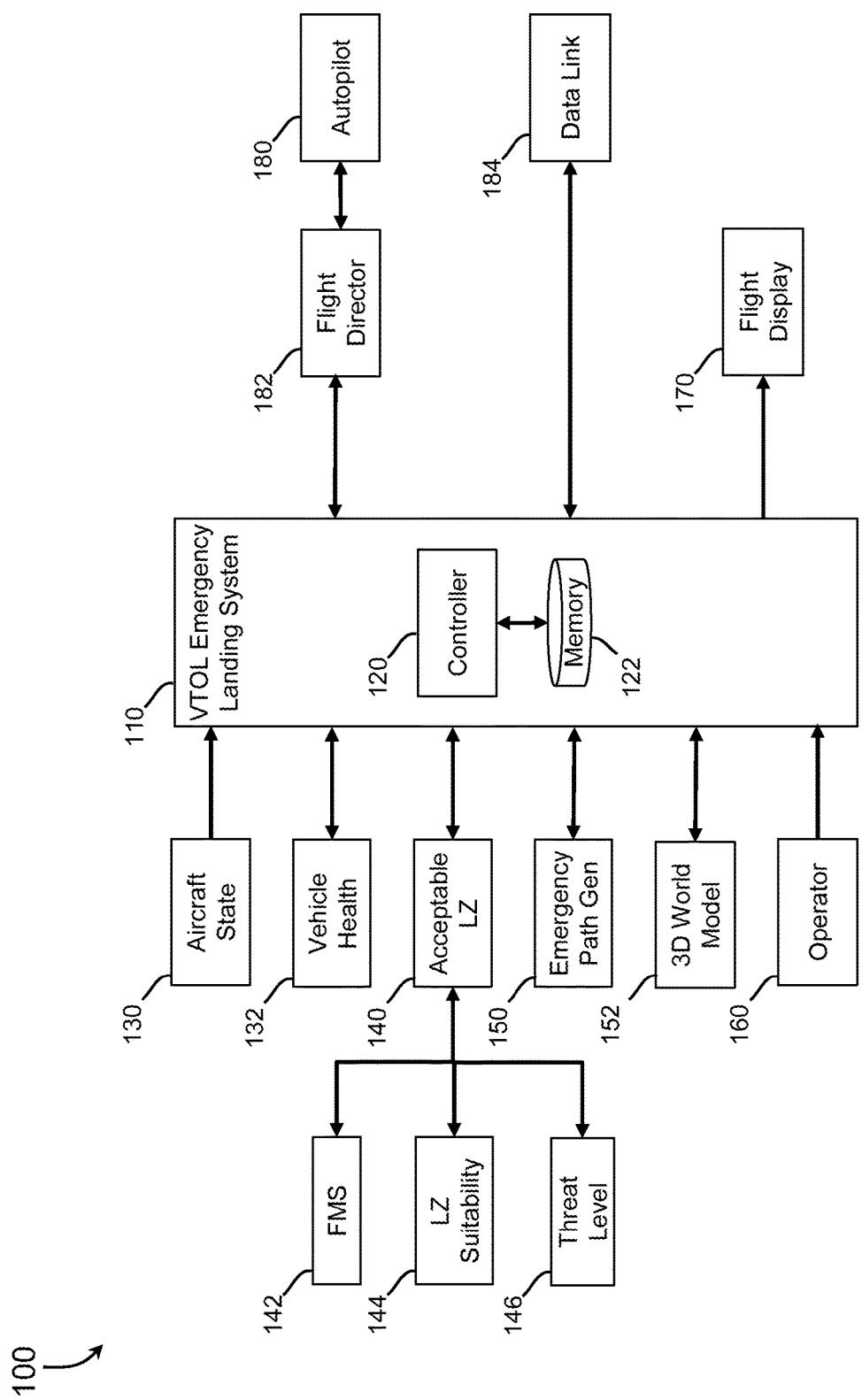
FIG. 1 is a diagram of a system for automated VTOL aircraft emergency landing in accordance with an embodiment of the inventive concepts disclosed herein.

Before explaining at least one embodiment of the inventive concepts disclosed herein in detail, it is to be understood that the inventive concepts are not limited in their application to the details of construction and the arrangement of the components or steps or methodologies set forth in the following description or illustrated in the drawings. In the following detailed description of embodiments of the instant inventive concepts, numerous specific details are set forth in order to provide a more thorough understanding of the inventive concepts. However, it will be apparent to one of ordinary skill in the art having the benefit of the instant disclosure that the inventive concepts disclosed herein may be practiced without these specific details. In other instances, well-known features may not be described in detail to avoid unnecessarily complicating the instant disclosure. The inventive concepts disclosed herein are capable of other embodiments or of being practiced or carried out in various ways. Also, it is to be understood that the phraseology and terminology employed herein is for the purpose of description and should not be regarded as limiting.

As used herein a letter following a reference numeral is intended to reference an embodiment of the feature or element that may be similar, but not necessarily identical, to a previously described element or feature bearing the same reference numeral (e.g., 1, 1a, 1b). Such shorthand notations are used for purposes of convenience only, and should not be construed to limit the inventive concepts disclosed herein in any way unless expressly stated to the contrary.

Further, unless expressly stated to the contrary, "or" refers to an inclusive or and not to an exclusive or. For example, a condition A or B is satisfied by anyone of the following: A is true (or present) and B is false (or not present), A is false (or not present) and B is true (or present), and both A and B are true (or present).

In addition, use of the "a" or "an" are employed to describe elements and components of embodiments of the instant inventive concepts. This is done merely for convenience and to give a general sense of the inventive concepts, thus "a" and "an" are intended to include one or at least one and the singular also includes the plural unless it is obvious that it is meant otherwise.

Finally, as used herein any reference to "one embodiment," or "some embodiments" means that a particular element, feature, structure, or characteristic described in connection with the embodiment is included in at least one embodiment of the inventive concepts disclosed herein. The appearances of the phrase "in some embodiments" in various places in the specification are not necessarily all referring to the same embodiment, and embodiments of the inventive concepts disclosed may include one or more of the features expressly described or inherently present herein, or any combination of sub-combination of two or more such features, along with any other features which may not necessarily be expressly described or inherently present in the instant disclosure.

Overview

Broadly, embodiments of the inventive concepts disclosed herein are directed to a system and method for automated vertical takeoff and landing (VTOL) aircraft emergency landing. The system receives a plurality of inputs from onboard modules including an aircraft state estimator, a vehicle health reasoner, an acceptable landing zone (LZ) assessor, an emergency landing path generator, and a 3D world model in order to prepare an emergency landing procedure when required or commanded. If functional onboard an unmanned VTOL aircraft, the vehicle health module determines when an emergency landing is required and if so, the system commands a damage tolerant autopilot to perform the emergency procedure and automatically control the VTOL aircraft. Otherwise, if functional onboard a manned VTOL aircraft, either an operator or the vehicle health module may command the emergency landing to be initiated. Regardless of initiation, the emergency landing system controls, or provides guidance for the manned control of, the VTOL aircraft from the point of initiation or battle damage through touchdown at a threat differentiated preferred LZ via failure-based flight control inputs for automatic landing, or autonomous autorotation entry, glide, and flare.

REFERENCE CHART

| | |
|---|---|
| 100 | System Diagram |
| 110 | VTOL Emergency Landing System |
| 120 | Controller |
| 122 | Memory |
| 130 | Aircraft State |
| 132 | Vehicle Health |
| 140 | Acceptable Landing Zone (LZ) |
| 142 | Flight Management System (FMS) |
| 144 | LZ Suitability Input |
| 146 | Threat Level |
| 150 | Emergency Landing Path Generator (ELPG) |
| 152 | 3D World Model |
| 160 | Operator |
| 170 | Flight Display |
| 180 | Damage Tolerant Autopilot |
| 182 | Flight Director |
| 184 | Data Link |
| 200 | Detail Diagram |
| 300 | Overhead View |
| 302 | Takeoff Airport |
| 304 | Destination Airport |
| 310 | VTOL Aircraft Position |
| 312 | LZ Range |
| 314 | Path |
| 320 | High Threat Level Area |
| 322 | High Threat Airport |
| 324 | Acceptable but High Threat LZ |
| 330 | Preferred LZ |
| 332 | Low Threat Alternate LZ |
| 334 | Low Threat Airport |
| 400 | Orthogonal View |
| 500 | Failure Procedure Matrix |
| 600 | Method Flow |

FIGS. 1 & 2

Figure 2:
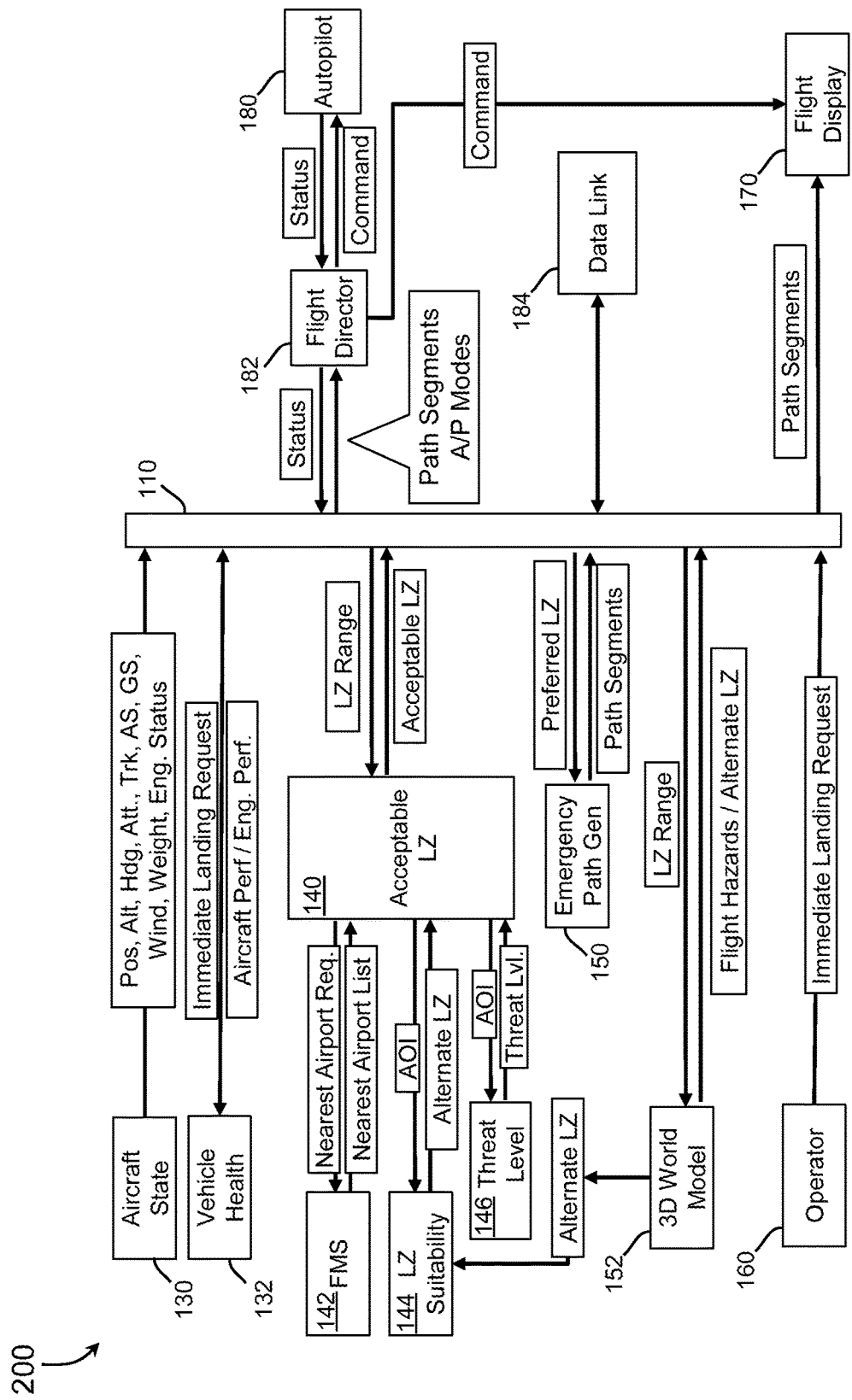
FIG. 2 is a diagram of a detailed system description in accordance with an embodiment of the inventive concepts disclosed herein.

Referring generally to FIGS. 1 and 2, a system diagram 100 of a system for automated VTOL aircraft emergency landing in accordance with an embodiment of the inventive concepts disclosed herein is shown. Generally, a system for automated VTOL aircraft emergency landing 110 may include a state data module 130 onboard a VTOL aircraft having at least one rotor. Here, the state data module may be configured to monitor an aircraft state input including a VTOL aircraft position, an altitude (above ground level (AGL) and mean sea level (MSL)), a heading, a track, an attitude, an airspeed, a groundspeed, a weight (e.g., zero fuel weight and gross weight), a fuel state, and the like, each input associated with the VTOL aircraft.

The state data module 130 may further provide an environmental input including an altitude wind vector associated with the VTOL aircraft altitude and a surface wind vector, each wind vector may be associated with the VTOL aircraft position including the general vicinity around the VTOL aircraft position (e.g., within 25 miles). The state data module 130 may additionally provide a plurality of data including weather information, temperature information, density altitude, pressure information, and the like.

In one embodiment of the inventive concepts disclosed herein, the Aircraft State module 130 may receive input from conventional means such as a pitot static system as well as a global navigation satellite system (GNSS/GPS) and an inertial navigation system (INS).

In one embodiment of the inventive concepts disclosed herein, the system for automated VTOL aircraft emergency landing 110 may include a vehicle health module 132 onboard the VTOL aircraft. The vehicle health module 132 may function to monitor an engine performance input and an aircraft performance input which may include a damage assessment of the VTOL aircraft. The engine performance input may include a plurality of engine parameters including RPM, EGT, torque, pressures and associated temperatures while the aircraft performance input may include such factors as main rotor function, tail rotor function, and control input function.

For example, the damage assessment may include whether the tail rotor is damaged or able to provide anti-torque and a level of anti-torque function or whether the main rotor may be damaged and able to provide cyclic maneuverability and at what level. In embodiments, the damage assessment of the VTOL aircraft may include a reduced function of an anti-torque system, a flight control surface, a flight control cyclic, a fuel system, a structural integrity, and the at least one rotor.

The vehicle health module 132 may monitor aircraft components including, for example, engine, rotor, actuators, and hydraulics. And may utilize a variety of methods (sensor detection, Bayesian probabilistic reasoning, etc.) to assess a capability and health of the VTOL aircraft. From these inputs, the vehicle health module 132 may determine if an emergency landing should be performed. Examples of this include, but are not limited to, detection of engine failure causing the controller 120 to command autorotation, and detection of actuation failure causing the controller 120 to perform actuator reconfiguration.

In one embodiment of the inventive concepts disclosed herein, the system for automated VTOL aircraft emergency landing 110 may further include an acceptable landing zone (LZ) module 140 onboard the VTOL aircraft. The acceptable landing zone module 140 may include a flight management system (FMS) input 142 as well as an LZ suitability input 144 and threat level 146. The acceptable landing zone (LZ) module 140 may store, maintain, and prioritize a listing of available and safe landing sites, both on-runway (e.g., airport runways/helipads) provided by the FMS 142 and off-runway (e.g., fields with unobstructed/flat terrain, roads) provided by the LZ suitability input 144. The LZ suitability input 144 may interact and receive data from a 3D world model 152 adding modeling data to the alternate LZ determination based on the LZ suitability input.

The acceptable LZ module 140 may dynamically update a listing of acceptable LZ and may include sites that are within an LZ range 312 (FIG. 3) from the VTOL aircraft position. The LZ suitability module 140 may analyze nearby terrain for suitable landing locations and assess each airport and alternate LZ for threat levels associated with each for safety landing the VTOL aircraft.

As used herein, an alternate LZ may be defined as a non-airport LZ capable of accepting an emergency landing of the VTOL aircraft. An acceptable LZ may be defined as a place on the surface (alternate LZ or airport) within the LZ range of the VTOL aircraft based on a plurality of current conditions internal and external to the VTOL aircraft. A preferred LZ may be defined as the selected area (airport or non-airport) for the VTOL aircraft to land based on all conditions including threats.

In one embodiment of the inventive concepts disclosed herein, the system for automated VTOL aircraft emergency landing 110 may also include a three-dimensional (3D) world model 152 onboard the VTOL aircraft. The 3D world model 152 may include a database of flight hazards. The database of flight hazards may include a terrain feature, an obstacle and a threat, and is further updated by at least one sensor onboard the VTOL aircraft.

Operating in cooperation between the acceptable LZ module 140 and the 3D world model 152, the system for automated VTOL aircraft emergency landing 110 may synthesize stored data, current sensed data from an onboard or offboard sensor (e.g. light detection and ranging (LIDAR)), as well as data linked inputs from a common operating picture (COP) sent and received via an onboard datalink 184, to determine ground characteristics, obstructions, and airport data. Using these inputs, the acceptable LZ module 140 may provide a listing of suitable off-runway LZ as well as airport based LZ for use.

In one embodiment of the inventive concepts disclosed herein, the system for automated VTOL aircraft emergency landing 110 may include an emergency landing path generator (ELPG) 150 onboard the VTOL aircraft. The ELPG 150 may be configured to receive a preferred LZ from the acceptable LZ module 140 and generate a path from the current VTOL aircraft position to the preferred LZ.

In embodiments, the ELPG 150 may plan aggressive but feasible trajectories for emergency landing situations. The ELPG 150 may produce a suite of paths for various vehicle health situations including aggressive minimal time-to-land autoland trajectories for normal thrust situations, minimal time-to-land reduced power autoland trajectories for reduced thrust situations (e.g., single engine-out situations in a dual engine aircraft), and autorotation landing trajectories for zero thrust situations.

In one embodiment of the inventive concepts disclosed herein, the system for automated VTOL aircraft emergency landing 110 may include a flight director 182 onboard the VTOL aircraft operatively coupled with a damage tolerant autopilot 180 for automatic control along an ELPG 150 paths.

In embodiments, the system for automated VTOL aircraft emergency landing 110 may function onboard a manned and unmanned VTOL aircraft. In the case of the manned aircraft, a human operator 160 may interact with the system for automated VTOL aircraft emergency landing 110 using traditional interfaces as well as receive flight direction via a flight display 170.

In one embodiment of the inventive concepts disclosed herein, the system for automated VTOL aircraft emergency landing 110 may further include a controller 120 onboard the VTOL aircraft operatively coupled with each of the state data module 130, the vehicle health module 132, the acceptable landing zone module 140, the ELPG 150, the 3D world model 152, the flight director 182, and the damage tolerant autopilot 180. The controller 120 may be directed by a tangible, non-transitory memory 122 onboard the VTOL aircraft and configured to communicate with the controller 120, the tangible, non-transitory memory 122 having instructions stored therein that, in response to execution by the controller, cause the controller to carry out each function of the system for automated VTOL aircraft emergency landing 110.

System Function

In one embodiment of the inventive concepts disclosed herein, the system for automated VTOL aircraft emergency landing 110 may receive, from the state data module 130, the aircraft state input including a VTOL aircraft position, an altitude, a heading, a track, an attitude, an airspeed, a groundspeed, a weight, and a fuel state, each associated with the VTOL aircraft. Here, the controller 120 may receive a continuous data stream from the aircraft state module 130 which may include each state parameter associated with the VTOL aircraft. In addition, the controller 120 may receive, from the state data module, the environmental input including an altitude wind vector associated with the VTOL aircraft altitude, and a surface wind vector, each associated with the VTOL aircraft position. As altitude winds and surface winds may play a part in determining not only the LZ range but also the preferred LZ, a continuous wind update to the controller 120 may enable accurate data for use in calculations.

In one embodiment of the inventive concepts disclosed herein, the controller 120 may receive, from the vehicle health module 132, the engine performance input including a normal thrust state, a reduced thrust state, and a zero-thrust state. Here, as the vehicle health module 132 may monitor each aspect of VTOL aircraft health, a normal thrust state may lead the controller 120 to return to continuous monitoring. However, an indication of a reduced thrust state or a zero thrust state may cause the vehicle health module 132 to send the controller 120 an immediate landing request.

For example, a dual engine flameout due a myriad of causes may lead the vehicle health module 132 to declare the zero thrust state and send the controller 120 an immediate landing request. Similarly, a combat related engine damage may result in the partial thrust state where the amount of available thrust may enable the VTOL aircraft to maintain altitude and continue. However, a lower available thrust may cause the VTOL aircraft to be unable to maintain altitude leading the vehicle health module 132 to send the controller 120 the immediate landing request.

In one embodiment of the inventive concepts disclosed herein, the controller 120 may additionally receive, from the vehicle health module 132, the aircraft performance input including a normal control status, a partial control status, and a battle damage control status. As above, a receipt of the normal control status may cause the controller 120 to continue monitoring while a receipt of a partial or battle damage control status may cause the vehicle health module 132 to send the controller 120 the immediate landing request.

For example, a combat related damage to the tail rotor may cause the VTOL aircraft to yaw in one direction (e.g., left yaw) where lift may be unaffected. Here, the partial control status may cause the vehicle health module 132 to send the controller 120 the immediate landing request. Similarly, a complete loss of a tail rotor may lead the vehicle health module 132 to declare a battle damage control status and send the controller 120 the immediate landing request.

In one embodiment of the inventive concepts disclosed herein, the controller 120 may continuously determine and update an LZ range 312 (FIG. 3), the LZ range may be defined as a current glide range of the VTOL aircraft associated with the VTOL aircraft position. The LZ range 312 may be based on each of the aircraft state input (e.g. AGL altitude, airspeed), the environmental input (e.g. winds), the engine performance input (e.g., full, partial, or zero thrust), and the aircraft performance input (e.g. flyability, glide ability).

The controller 120 may also receive, from the 3D world model 152, an alternate LZ within the LZ range, the alternate LZ defined as a non-airport LZ capable of accepting an emergency landing of the VTOL aircraft. Here, as the VTOL aircraft may fly at low altitudes in areas where no airport may be nearby, the system for automated VTOL aircraft emergency landing 110 may determines a landing on a flat area free of obstacles may be the best option.

In one embodiment of the inventive concepts disclosed herein, the controller 120 may receive, from the acceptable LZ module 140, 1) the FMS input including an airport within the LZ range 312, 2) the LZ suitability input including an airport characteristic of the airport and an LZ characteristic of the alternate LZ, and 3) a threat level associated with each of the VTOL aircraft position, the airport within the LZ range 312, and the alternate LZ within the LZ range 312. An airport characteristic may include an airport position, a runway length, a runway width, a runway heading, a helipad size, and a taxiway length while the LZ characteristic may include an LZ size, an LZ orientation, an LZ elevation, a terrain feature, an associated maintenance availability, an associated emergency response capability, and an obstacle.

For example, as the VTOL aircraft traverses a route, the best emergency LZ may be a nearby airport. As the VTOL aircraft continues along the route, there may be an acceptable airport nearby, but the threat level associated with the nearby airport may be above a preselected threshold and therefore be unacceptable. In another scenario, an airport helipad may be too small for the VTOL aircraft and therefore unacceptable. Therefore, the controller 120 may bypass the high threat nearby airport for a lower threat alternate LZ such as a grassy field.

In one embodiment of the inventive concepts disclosed herein, the controller may function to periodically update the environmental input (e.g., update the winds), the LZ characteristic, the threat level, the 3D world model, and the database of flight hazards based on a reception of an external signal via the onboard datalink 184. For example, the onboard datalink 184 may enable the VTOL aircraft to communicate with external assets which update the system for automated VTOL aircraft emergency landing 110 to the most current information.

The controller 120 may continuously determine and update an acceptable LZ from one of the alternate LZ and the airport (each within the LZ range) based on 1) the LZ range, 2) the FMS input, and 3) the LZ suitability input and continuously determine and update, the preferred LZ from the acceptable LZ (or many acceptable LZ) based on the threat level associated with each of the acceptable LZ. Here, the controller 120 may determine the preferred LZ as the best location for the emergency landing of the VTOL aircraft given all inputs.

In one embodiment of the inventive concepts disclosed herein, the controller 120 may continuously generate, via the ELPG 150, the path from the VTOL aircraft position to the preferred LZ based on 1) the aircraft state input, 2) the environmental input, 3) the engine performance input, 4) the aircraft performance input, 5) the LZ suitability input, and 6) the 3D World Model input. The path may have a start point collocated with the VTOL aircraft position and a touchdown point associated with the preferred LZ. Also, the path may further include a glide segment, a glide speed, a glide angle of bank, and an autorotation segment.

In one embodiment of the inventive concepts disclosed herein, the ELPG 150 may accept data from each of the above sources to determine the vehicle state, surrounding world, and preferred LZ. With this information, the ELPG 150 may generate appropriate paths (kinematically feasible trajectories) from current VTOL aircraft position to the preferred LZ to utilize for an emergency landing. In cases where powered flight may be feasible, the ELPG 150 may plan aggressive minimal time-to-land autoland trajectories while in cases with degraded vehicle state or engine failure present, the ELPG 150 may generate kinematically feasible autorotation paths.

In embodiments, the ELPG 150 may generate paths for additional failure modes such as a reduced power operation (e.g., single engine failure in a dual engine VTOL aircraft)

resulting in a suite of potential paths for the VTOL aircraft to follow depending on the health state of the VTOL aircraft.

In one embodiment of the inventive concepts disclosed herein, the path may be generated in a similar manner to that found in U.S. Pat. No. 10,124,907 (hereinafter '907 patent) wherein a generated feasible three-dimensional autorotation trajectory may be useful for the VTOL aircraft with a zero-thrust status. Also, the aircraft performance input may enable the controller 120 to generate a specific path based on a specific subsystem failure onboard the VTOL aircraft.

In one embodiment of the inventive concepts disclosed herein, the controller 120 may receive an immediate landing request from the vehicle health module 132 and command the damage tolerant autopilot 180, upon response of the immediate landing request, to employ a plurality of failure based control inputs to maneuver the VTOL aircraft using an all axis closed loop control from the start point to the touchdown point via the path, the plurality of failure based control inputs based on the engine performance input and the aircraft performance input.

In a further embodiment where the system for automated VTOL aircraft emergency landing 110 is functional onboard a manned VTOL aircraft and a flight display 170 may be available to the manned operator 160, the controller 120 may receive the immediate landing request from either the manned operator 160 or the vehicle health module 132. Once received, the controller 120 may direct the flight director 182 to display, on the flight display 170, a flight control guidance command, a collective guidance command, an autorotation command, and a power command, each command associated with the path.

Alternatively, should the manned operator 160 desire a hands off landing, the controller 120 may, upon selection by the manned operator 160 or the vehicle health module 132, command the damage tolerant autopilot 180 to employ the plurality of failure based control inputs to maneuver the VTOL aircraft using the all axis closed loop control from the start point to the touchdown point via the path. In embodiments, the plurality of failure-based control inputs may include a maneuvering limit bounded by a flight envelope of the VTOL aircraft.

In embodiments, the controller 120 may publish the path to two sources for display. The flight display 170 may include a primary or multi-function flight display (PFD or MFD) where the path may be drawn for the operator 160 to visualize. The flight display 170 may primarily serve for operator situational awareness (SA) as the emergency landing commences. Additionally, the flight display 170 may include the Flight Director 182 offering guidance commands and operator 160 cueing. For powered flight cases, these guidance commands may include conventional flight director modes, whereas for engine-out and reduced power situations, these would be custom guidance commands designed specifically for these flight regimes.

Referring now to FIG. 2, a diagram of a detailed system description 200 in accordance with an embodiment of the inventive concepts disclosed herein is shown. The aircraft state module 130 may input the indicated plurality of state data to the controller 120 while the vehicle health module 132 may monitor aircraft performance and engine performance data and determine whether the immediate landing request should be sent to the controller 120.

The acceptable LZ module 140 may receive the LZ range and query its submodules including the FMS 142, the LZ suitability input 144 and the threat level 146 to eventually determine the acceptable LZ (one or more acceptable LZ). The ELPG 150 may receive the preferred LZ from the controller 120 and generate the path as discussed above. The 3D world model 152 may receive the LZ range and determine flight hazards and each alternate LZ within the LZ range.

The operator 160 may input the immediate landing request to the controller and follow the path segments displayed on the flight display or select the damage tolerant autopilot 180 to fly the automated emergency landing.

In embodiments, the manned operator 160 may be required to take no action to enable the system for automated VTOL aircraft emergency landing 110 to perform the autonomous landing. Should the manned operator 160 be incapable of piloting the VTOL aircraft, the controller 120 may function to command the damage tolerant autopilot 180 to perform the automated emergency landing including, if necessary, an autonomous autorotation entry, an autonomous glide, and an autonomous flare to the touchdown point with no action from the manned operator 160.

FIG. 3

Figure 3:
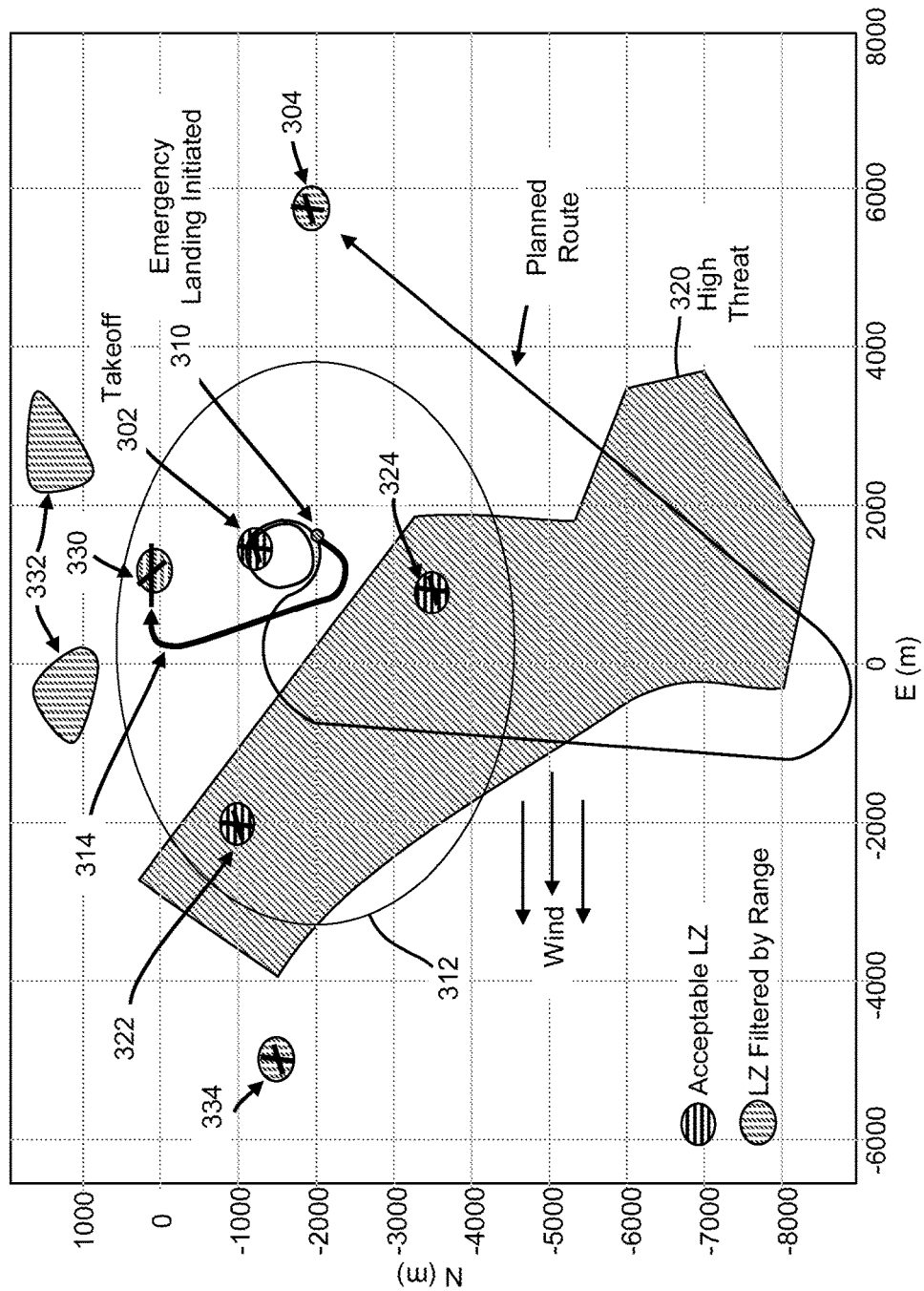
FIG. 3 is a diagram of an overhead view exemplary of an embodiment of the inventive concepts disclosed herein.

Referring now to FIG. 3, a diagram of an overhead view 300 exemplary of an embodiment of the inventive concepts disclosed herein is shown. One exemplary scenario may include the VTOL aircraft launching from a takeoff airport 302 and planning to fly a planned route to a destination airport 304. At one VTOL aircraft position 310 the VTOL aircraft may suffer some battle damage and the controller 120, via the vehicle health module 132 or selected by the manned operator 160, may initiate the automated emergency landing.

LZ Filtering

In one embodiment of the inventive concepts disclosed herein, the controller 120 may function to filter potential landing areas based on a plurality of factors. Here, one first exemplary filter may include an area of interest (AOI). As the VTOL aircraft may be stationed in various parts of the world, the FMS input 142 may function to filter airports and alternate LZ outside the AOI which may be of non-use to the system for automated VTOL aircraft emergency landing 110. An exemplary next filter may include the LZ range 312. Due to the current state data of the VTOL aircraft, the environment input, the engine status, and aircraft status, the LZ range 312 may enable the controller 120 to filter out additional landing areas too distant for the damaged VTOL aircraft to reach.

A next exemplary filter may be the LZ suitability input 144. Should potential landing areas within the LZ range have a runway, a grass open area, or a rocky area near the potential LZ may influence the controller 120 to filter out some of the potential landing areas a too dangerous given the current status of the VTOL aircraft and the type of emergency landing required.

A next exemplary filter may include threat levels 146. As one desire of the system for automated VTOL aircraft emergency landing 110 may include keeping the VTOL aircraft and crew out of high threat areas, the controller 120 may filter airports and alternate LZ within a high threat area. The remaining list of airports or alternate LZ may be those for the controller 120 to determine as preferred LZ and generate a path to each.

Here, the controller 120 may determine the LZ range 312 based on the plurality of factors described above (e.g., aircraft state, engine state, wind) and an energy state of the VTOL aircraft (potential and kinetic) and may determine a list of acceptable LZ within the LZ range 312. Here, four airports meet the acceptable LZ criteria of being within the LZ range 312. Each potential LZ within the LZ range 312 may be a candidate for the emergency landing.

One acceptable LZ but high threat 324 may be a candidate airport but also falls within a high threat level area 320 which may outline places undesirable for the VTOL aircraft to land. Additionally, within the high threat area 320, a high threat airport 322 may be acceptable but not desirable.

Also, within the LZ range 312, but outside the high threat area 320, are the takeoff airport and one additional airport. Note here, two low threat alternate LZ 332 may be nearby yet outside the LZ range 312. Also, outside the LZ range, a low threat airport 334 may be beyond the glide range of the current state of the VTOL aircraft.

The controller 120 may determine the preferred LZ 330 is both within the LZ range 312 as well as in a low threat area or at least outside the high threat area 320. The controller 120 may, via the ELPG 150, determine the path 314 to the preferred LZ 330 is the best option for the VTOL aircraft given the current state. Even though the takeoff airport 302 may be closer to the VTOL aircraft position 310, the controller 120 may determine the glide parameters and possible need for a straight flight segment may drive the need for a more distant LZ than merely the closest LZ. Also, a need to remain clear of the high threat area 320 may influence the controller 120 to determine the preferred LZ 330 is the best choice.

In one embodiment of the inventive concepts disclosed herein, the controller 120 may determine that no low threat airports 334 may be within the range 312 of the disabled VTOL aircraft. Should this be the case, the controller 120 may attempt to land the aircraft to the best available LZ even if not all of the filtering criteria are satisfied. This may be a last resort option for ensuring a safe landing for the VTOL aircraft.

In one embodiment, the controller 120 may determine each of the at least one acceptable LZ are within the high threat level area 320, determine a hierarchy of the at least one acceptable LZ based on the threat level associated with each of the at least one acceptable LZ, and selecting a lowest threat LZ from the hierarchy as the preferred LZ. In this manner, if the VTOL aircraft is within a high threat area and may not be able to glide to a low threat area, the controller 120 may select the lowest threat LZ as the preferred LZ.

In one embodiment of the inventive concepts disclosed herein, the pilot may perform a "look ahead" function while preflight planning. The pilot may input the AOI to the controller 120 and command an assessment by the LZ server. In this manner, the controller 120 may offer preferred LZ along a preselected route.

FIG. 4

Figure 4:
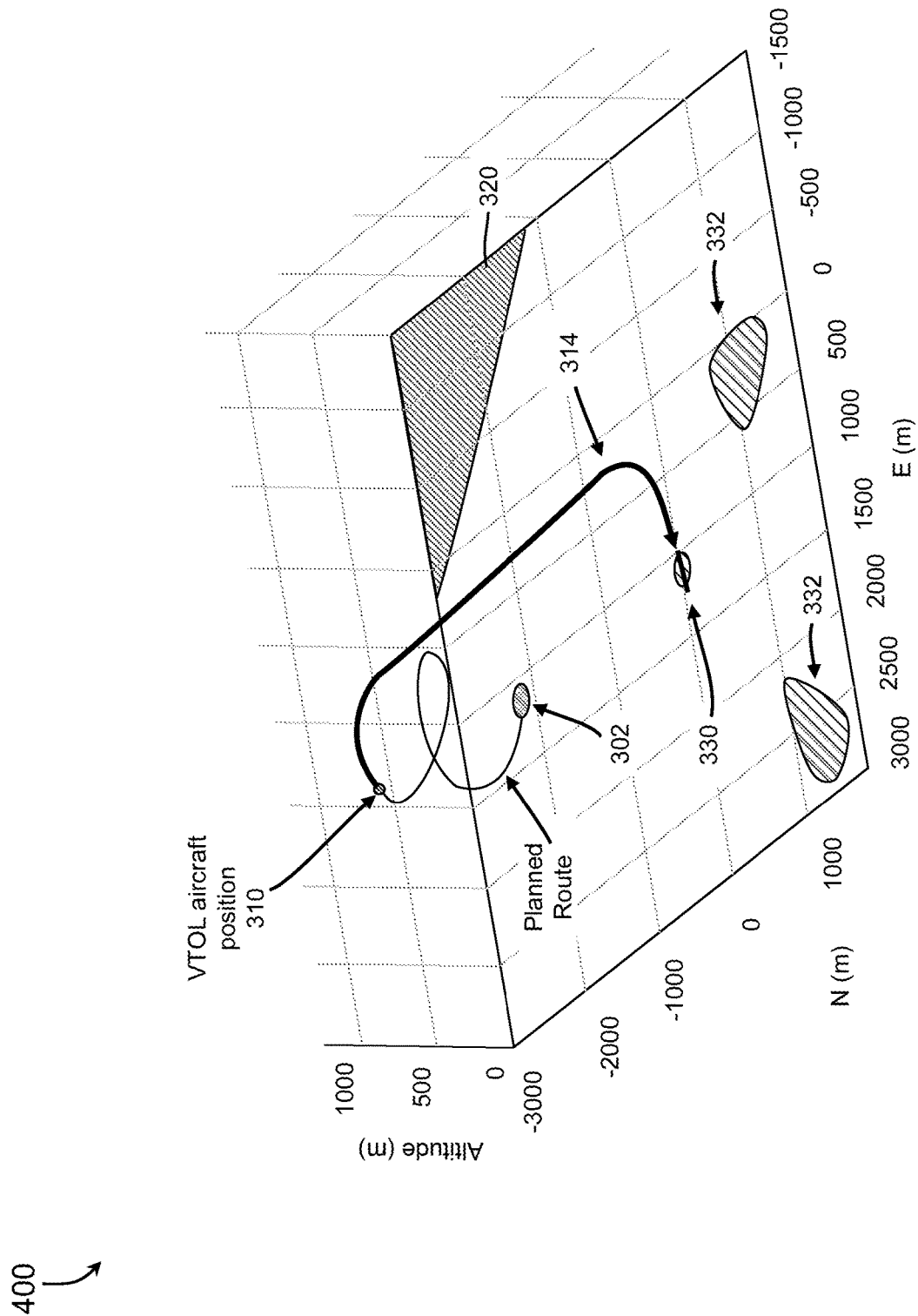
FIG. 4 is a diagram of an orthogonal view exemplary of one embodiment of the inventive concepts disclosed herein.

Referring now to FIG. 4, a diagram of an orthogonal view exemplary of one embodiment of the inventive concepts disclosed herein is shown. The start point of the path collocated with the VTOL aircraft position 310 may indicate the decision point at which the controller 120 receives the request for immediate landing request from either the vehicle health module 132 or the manned operator 160.

The ELPG 150 may determine a right turn segment, a descending segment along a straight path, and then a right turn to align with a runway within the preferred LZ 330. In one exemplary path generated by the ELPG 150, the path may include an autonomous autorotation entry, an autonomous glide, and an autonomous flare to the touchdown point with no action from the manned operator.

FIG. 5

Referring now to FIG. 5, a diagram of an exemplary failure procedure matrix 500 in accordance with one embodiment of the inventive concepts disclosed herein is shown. Here, an exemplary list of flight regimes and tail rotor scenarios may list one exemplary control logic embedded within the system for automated VTOL aircraft emergency landing 110. The damage tolerant autopilot 180 may automate performance of these types of procedures while guaranteeing stability of the VTOL aircraft.

Of note, FIG. 5 may be one example of a failure procedure matrix. In some models of VTOL aircraft, the main rotor is spun in the opposite direction of US designed helicopters. Hence, the tail rotor may push thrust in the opposite direction as indicated in FIG. 5 and the left/right crosswind and left/right yaw notes would be reversed. FIG. 5 may be an exemplary version where similar versions may be within the scope of the inventive concepts disclosed herein.

For example (indicated by the arrow in FIG. 5), should the VTOL aircraft, while in forward flight, become a causality of enemy fire and lose control (loss of thrust) of the tail rotor, the VTOL aircraft may experience left yaw since the anti-torque capability is lost. Here, the controller 120 may immediately proceed through the steps of selecting the preferred LZ based on each of the plurality of inputs. One input in this scenario may include a requirement to land at 120 knots and the LZ required to do so. In this scenario, if the airspeed (aircraft state data) is at least 120-125 knots indicated airspeed (pitot static measurement), the airflow across vertical tail fins may enable the VTOL aircraft to maintain straight and level flight. Here, the damage tolerant autopilot 180 may function in compliance with this matrix and maintain the forward airspeed from the point of damage, failure, or initiation to touchdown.

The damage tolerant autopilot 180 may control the VTOL aircraft employing the plurality of failure-based control inputs to maneuver the VTOL aircraft using an all axis closed loop control in a shallow approach with left sideslip. The damage tolerant autopilot 180 may land the aircraft with a level landing attitude and land at the preferred LZ 330 using the long runway able to accept a 120-knot landing having a right to left crosswind.

In one embodiment of the inventive concepts disclosed herein, with guidance outputs from the flight director 182, the damage tolerant autopilot 180 or flight control computer (FCC) may provide inner loop flight control to automatically stabilize the VTOL aircraft and follow the guidance commands. Much like the flight director 182, conventional autopilot modes may be employed in several cases (e.g., 120 knots straight and level flight), but in others (such as autorotation), custom modes for those flight regimes may be necessary.

Within the system for automated VTOL aircraft emergency landing 110 the damage tolerant autopilot 180 may include modes for immediate activation and response when significant damage to the VTOL aircraft may occur. In cases of limited damage, the damage tolerant autopilot 180 gains and control effort may be adaptively adjusted to stabilize the VTOL aircraft in response to changes in inertial characteristics and actuator effectiveness. In cases with more significant damage such as loss of (or stuck) tail rotor/anti-torque authority, the damage tolerant autopilot 180 may automatically perform emergency landing procedures such as retrimming the vehicle for entry into an autorotation descent if safe to do so (in a region of the height velocity (HV) diagram with enough energy to establish a stable autorotation), or enable a high bandwidth control mode that maintains level pitch and roll attitude of the VTOL aircraft while the controller 120 commands a stable powered descent. Note that in this latter case, the VTOL aircraft may be spinning wildly in heading but through this mode the controller 120 may command a safe and survivable touch down.

In one embodiment of the inventive concepts disclosed herein, the manned operator 160 may be provided an interface to the system enabling the manned operator 160 a request that a landing be performed along one of the generated emergency paths to a safe landing at the preferred LZ 330. The manned operator 160 may be in a supervisory position with the entirety of the landing zone perception/assessment, vehicle health reasoning, path planning, and flight control happening autonomously.

The system for automated VTOL aircraft emergency landing 110 may represent a powerful and highly capable system resulting in fail-active performance and ultimately safe landing in emergency situations.

FIG. 6

Figure 6:
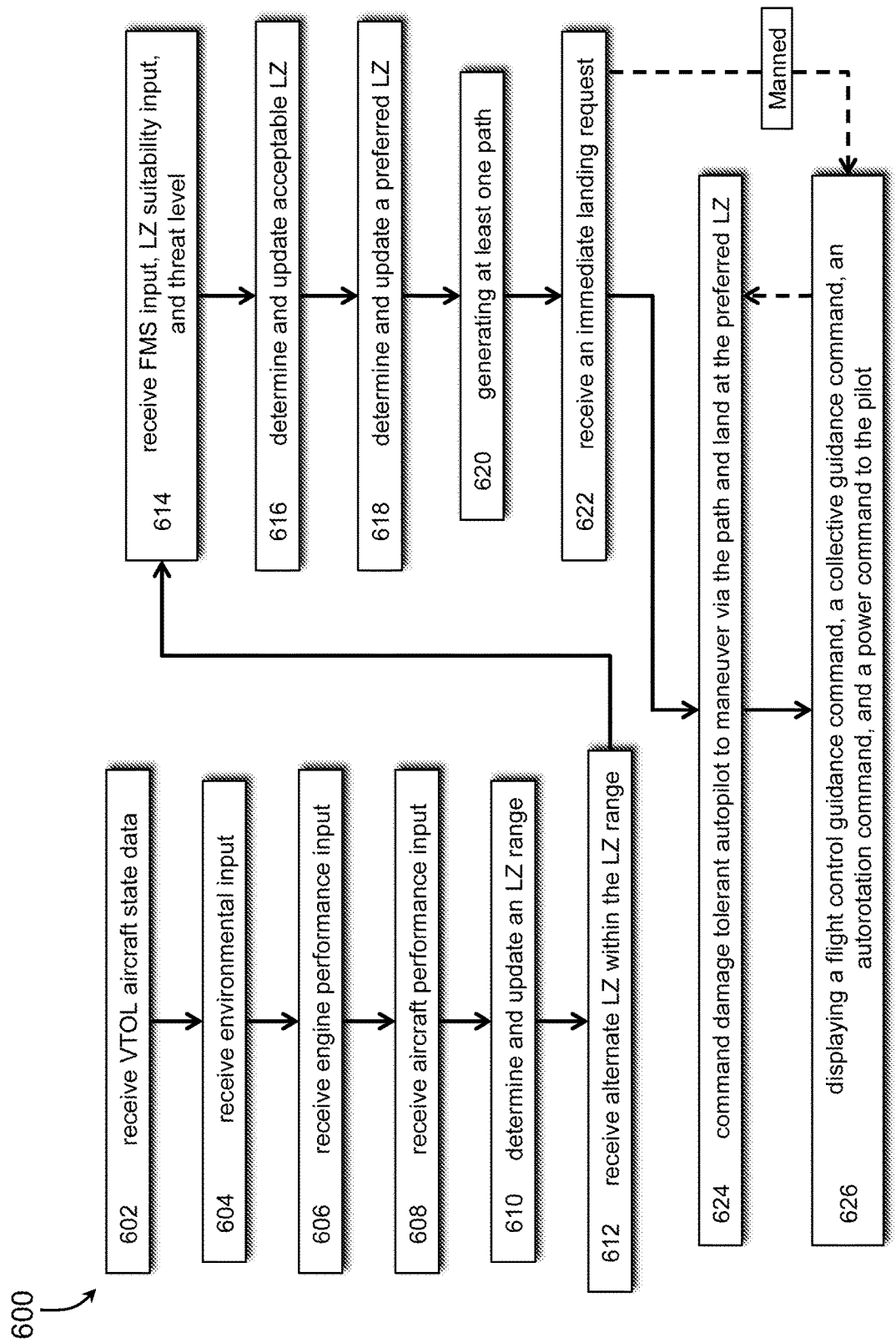
FIG. 6 is a diagram of an exemplary method flow in accordance with one embodiment of the inventive concepts disclosed herein.

Referring now to FIG. 6, a diagram of an exemplary method flow 600 in accordance with one embodiment of the inventive concepts disclosed herein is shown. The method may include, at a step 602, receiving, from a state data module onboard a VTOL aircraft, at least one aircraft state input including a VTOL aircraft position, an altitude, a heading, a track, an attitude, an airspeed, a groundspeed, each associated with the VTOL aircraft, and at a step 604, receiving, from the state data module, at least one environmental input including a surface wind magnitude and a surface wind direction, each associated with the VTOL aircraft position.

The method may include, at a step 606, receiving, from a vehicle health module onboard the VTOL aircraft, at least one engine performance input including one of: a normal thrust state, a reduced thrust state, and a zero thrust state, and at a step 608, receiving, from the vehicle health module, at least one aircraft performance input including a normal control status, a partial control status, and a battle damage control status.

The method may include, at a step 610, continuously determining and updating an LZ range, the LZ range a current glide range of the VTOL aircraft associated with the VTOL aircraft position and based on each of: the at least one aircraft state input, the at least one environmental input, the at least one engine performance input, and the at least one aircraft performance input, and at a step 612, receiving, from a 3D world model onboard the VTOL aircraft, at least one alternate LZ within the LZ range, the at least one alternate LZ a non-airport LZ capable of accepting an emergency landing of the VTOL aircraft.

The method may include, at a step 614, receiving, from an acceptable LZ module onboard the VTOL aircraft, 1) at least one FMS input including at least one airport within the LZ range, 2) at least one LZ suitability input including a) an airport characteristic of the at least one airport and b) an LZ characteristic of the at least one alternate LZ, and 3) a threat level associated with each of: the VTOL aircraft position, the at least one airport within the LZ range, and the at least one alternate LZ within the LZ range, and at a step 616, continuously determining and updating at least one acceptable LZ from one of: the at least one alternate LZ and the at least one airport based on: 1) the LZ range, 2) the at least one FMS input, and 3) the at least one LZ suitability input.

The method may include, at a step 618, continuously determining and updating, a preferred LZ from the at least one acceptable LZ based on the threat level, range, and similar filtering criteria associated with each of the at least one acceptable LZ, and at a step 620, continuously generating, via an emergency landing path generator onboard the VTOL aircraft, at least one path from the VTOL aircraft position to the preferred LZ based on: 1) the at least one aircraft state input, 2) the at least one environmental input, 3) the at least one engine performance input, 4) the at least one aircraft performance input, 5) the at least one LZ suitability input, and 6) at least one 3D World Model input, the at least one path having a start point collocated with the VTOL aircraft position and a touchdown point associated with the preferred LZ, the at least one path further including at least one of: a glide segment, a glide speed, a glide angle of bank, an autorotation segment, and a minimal time-to-land autoland segment.

The method may include, at a step 622, receiving an immediate landing request from one of: an operator onboard the VTOL aircraft and the vehicle health module, and at a step 624, commanding a damage tolerant autopilot, upon response of the immediate landing request, to employ a plurality of failure based control inputs to maneuver the VTOL aircraft using an all axis closed loop control from the start point to the touchdown point via the at least one path, the plurality of failure based control inputs based on the at least one engine performance input and the at least one aircraft performance input.

The method may include, at a step 626, as an alternate embodiment wherein the maned operator may decide to fly the VTOL aircraft, directing a flight director onboard the VTOL aircraft to display, on a flight display onboard the VTOL aircraft, one of: a flight control guidance command, a collective guidance command, an autorotation command, and a power command, each command associated with the at least one path for the pilot to manually fly the path if desired.

CONCLUSION

As will be appreciated from the above description, embodiments of the inventive concepts disclosed herein may provide an automated emergency landing system that can provide reliable, automatic guidance and control to a safe landing zone in the event of reduced vehicle performance (e.g., damage, component failure, etc.)

It is to be understood that embodiments of the methods according to the inventive concepts disclosed herein may include one or more of the steps described herein. Further, such steps may be carried out in any desired order and two or more of the steps may be carried out simultaneously with one another. Two or more of the steps disclosed herein may be combined in a single step, and in some embodiments, one or more of the steps may be carried out as two or more sub-steps. Further, other steps or sub-steps may be carried in addition to, or as substitutes to one or more of the steps disclosed herein.

From the above description, it is clear that the inventive concepts disclosed herein are well adapted to carry out the objects and to attain the advantages mentioned herein as well as those inherent in the inventive concepts disclosed herein. While presently preferred embodiments of the inventive concepts disclosed herein have been described for purposes of this disclosure, it will be understood that numerous changes may be made which will readily suggest themselves to those skilled in the art and which are accomplished within the broad scope and coverage of the inventive concepts disclosed and claimed herein.

What is claimed is:

1. A system for automated vertical takeoff and landing (VTOL) aircraft emergency landing, comprising:
   a state data module onboard a VTOL aircraft having at least one rotor, the state data module configured to monitor at least one aircraft state input and at least one environmental input;
   a vehicle health module onboard the VTOL aircraft, the vehicle health module configured to monitor at least one engine performance input and at least one aircraft performance input, the at least one aircraft performance input including a damage assessment of the VTOL aircraft;
   an acceptable landing zone (LZ) module onboard the VTOL aircraft, the acceptable landing zone module including at least one flight management system (FMS) input, at least one LZ suitability input, and at least one threat level;
   an emergency landing path generator onboard the VTOL aircraft, the emergency landing path generator configured at least to receive a preferred LZ and generate at least one path to the preferred LZ;
   a three-dimensional (3D) world model onboard the VTOL aircraft, the three-dimensional world model including a database of flight hazards;
   a flight director onboard the VTOL aircraft and operatively coupled with a damage tolerant autopilot;
   a controller onboard the VTOL aircraft and operatively coupled with each of the state data module, the vehicle health module, the acceptable landing zone module, the emergency path generator, the three-dimensional world model, the flight director, and the damage tolerant autopilot;
   a tangible, non-transitory memory onboard the VTOL aircraft and configured to communicate with the controller, the tangible, non-transitory memory having instructions stored therein that, in response to execution by the controller, cause the controller to:
   receive, from the state data module, the at least one aircraft state input including a VTOL aircraft position, a VTOL aircraft altitude, a heading, a track, an attitude, an airspeed, a groundspeed, a weight, and a fuel state, each associated with the VTOL aircraft;
   receive, from the state data module, the at least one environmental input including an altitude wind vector associated with the VTOL aircraft altitude, and a surface wind vector, each associated with the VTOL aircraft position;
   receive, from the vehicle health module, the at least one engine performance input including one of: a normal thrust state, a reduced thrust state, and a zero-thrust state;
   receive, from the vehicle health module, the at least one aircraft performance input including a normal control status, a partial control status, and a battle damage control status;
   continuously determine and update an LZ range, the LZ range a current glide range of the VTOL aircraft associated with the VTOL aircraft position and based on each of: the at least one aircraft state input, the at least one environmental input, the at least one engine performance input, and the at least one aircraft performance input;
   receive, from the 3D world model, at least one 3D world model input including 1) at least one alternate LZ within the LZ range, the at least one alternate LZ a non-airport LZ capable of accepting an emergency landing of the VTOL aircraft, and 2) at least one flight hazard, the at least one flight hazard one of: an obstacle and a threat to the VTOL aircraft;
   receive, from the acceptable LZ module, 1) the at least one FMS input including at least one airport within the LZ range, and 2) the at least one LZ suitability input including an airport characteristic of the at least one airport and an LZ characteristic of the at least one alternate LZ, and 3) the at least one threat level associated with each of: the VTOL aircraft position, the at least one airport within the LZ range, and the at least one alternate LZ within the LZ range;
   continuously determine and update at least one acceptable LZ from one of: the at least one alternate LZ and the at least one airport based on: 1) the LZ range, 2) the at least one FMS input, and 3) the at least one LZ suitability input;
   continuously determine and update, the preferred LZ from the at least one acceptable LZ based on the threat level and LZ range associated with each of the at least one acceptable LZ;
   continuously generate, via the emergency landing path generator, the at least one path from the VTOL aircraft position to the preferred LZ based on: 1) the at least one aircraft state input, 2) the at least one environmental input, 3) the at least one engine performance input, 4) the at least one aircraft performance input, 5) the at least one LZ suitability input, and 6) the at least one 3D world model input, the at least one path having a start point collocated with the VTOL aircraft position and a touchdown point associated with the preferred LZ, the at least one path further including at least one of: a glide segment, a glide speed, a glide angle of bank, an autorotation segment, a minimal time-to-land autoland segment;
   receive an immediate landing request from the vehicle health module; and
   command the damage tolerant autopilot, upon response of the immediate landing request, to employ a plurality of failure based control inputs to maneuver the VTOL aircraft using an all axis closed loop control from the start point to the touchdown point via the at least one path, the plurality of failure based control inputs based on the at least one engine performance input and the at least one aircraft performance input.

2. The system for automated VTOL aircraft emergency landing of claim 1, further comprising a manned operator onboard the VTOL aircraft and a flight display available to the manned operator, the non-transitory memory having further instructions stored therein that, in response to the execution by the controller, cause the controller to:
   receive the immediate landing request from one of: the manned operator and the vehicle health module;
   direct the flight director to display, on the flight display, a flight control guidance command, a collective guidance command, an autorotation command, and a power command, each command associated with the at least one path; and
   upon selection by the manned operator or the vehicle health module, command the damage tolerant autopilot to employ the plurality of failure-based control inputs to maneuver the VTOL aircraft using the all axis closed loop control from the start point to the touchdown point via the at least one path.

3. The system for automated VTOL aircraft emergency landing of claim 1, wherein the aircraft state input is generated by one of: a pitot static system onboard the VTOL aircraft, an inertial system onboard the VTOL aircraft, and a global navigation satellite system receiver onboard the VTOL aircraft.

4. The system for automated VTOL aircraft emergency landing of claim 1, wherein the airport characteristic further comprises an airport position, a runway length, a runway width, a runway heading, a helipad size, an associated maintenance availability, an associated emergency response capability, and a taxiway length.

5. The system for automated VTOL aircraft emergency landing of claim 1, wherein the LZ characteristic further comprises an LZ size, an LZ orientation, an LZ elevation, a terrain feature, and an obstacle.

6. The system for automated VTOL aircraft emergency landing of claim 1, wherein the controller is further configured to:
periodically update the at least one environmental input, the LZ characteristic, the threat level, the 3D world model, and the database of flight hazards based on a reception of an external signal; and
receive a preflight input from a pilot and determine at least one preferred LZ based on a preselected route.

7. The system for automated VTOL aircraft emergency landing of claim 1, wherein the damage assessment of the VTOL aircraft further comprises a reduced function of at least one of: an anti-torque system, a flight control surface, a flight control cyclic, a fuel system, a structural integrity, and the at least one rotor.

8. The system for automated VTOL aircraft emergency landing of claim 1, wherein the database of flight hazards further comprises at least one of: a terrain feature, an obstacle and a threat, and is further updated by at least one sensor onboard the VTOL aircraft.

9. The system for automated VTOL aircraft emergency landing of claim 1, wherein command the damage tolerant autopilot to maneuver the VTOL aircraft further comprises an autonomous autorotation entry, an autonomous glide, an autonomous minimal time-to-land autoland, and an autonomous flare to the touchdown point.

10. The system for automated VTOL aircraft emergency landing of claim 1, wherein the plurality of failure based control inputs further comprises a maneuvering limit bounded by a flight envelope of the VTOL aircraft.

11. The system for automated VTOL aircraft emergency landing of claim 1, wherein the at least one aircraft performance input enables the controller to generate a specific path of the at least one path based on a specific subsystem failure onboard the VTOL aircraft.

12. A method for automated vertical takeoff and landing (VTOL) aircraft emergency landing, comprising:
receiving, from a state data module onboard a VTOL aircraft having at least one rotor, at least one aircraft state input including a VTOL aircraft position, a VTOL aircraft altitude, a heading, a track, an attitude, an airspeed, a groundspeed, each associated with the VTOL aircraft;
receiving, from the state data module, at least one environmental input including a surface wind magnitude and a surface wind direction, each associated with the VTOL aircraft position;
receiving, from a vehicle health module onboard the VTOL aircraft, at least one engine performance input including one of: a normal thrust state, a reduced thrust state, and a zero-thrust state;
receiving, from the vehicle health module, at least one aircraft performance input including a normal control status, a partial control status, and a battle damage control status;
continuously determining and updating an LZ range, the LZ range a current glide range of the VTOL aircraft associated with the VTOL aircraft position and based on each of: the at least one aircraft state input, the at least one environmental input, the at least one engine performance input, and the at least one aircraft performance input;
receiving, from a 3D world model onboard the VTOL aircraft, at least one 3D world model input including 1) at least one alternate LZ within the LZ range, the at least one alternate LZ a non-airport LZ capable of accepting an emergency landing of the VTOL aircraft, and 2) at least one flight hazard, the at least one flight hazard one of: an obstacle and a threat to the VTOL aircraft;
receiving, from an acceptable LZ module onboard the VTOL aircraft, 1) at least one FMS input including at least one airport within the LZ range, 2) at least one LZ suitability input including a) an airport characteristic of the at least one airport and b) an LZ characteristic of the at least one alternate LZ, and 3) a threat level associated with each of: the VTOL aircraft position, the at least one airport within the LZ range, and the at least one alternate LZ within the LZ range;
continuously determining and updating at least one acceptable LZ from one of: the at least one alternate LZ and the at least one airport based on: 1) the LZ range, 2) the at least one FMS input, and 3) the at least one LZ suitability input;
continuously determining and updating, a preferred LZ from the at least one acceptable LZ based on the threat level associated with each of the at least one acceptable LZ;
continuously generating, via an emergency landing path generator onboard the VTOL aircraft, at least one path from the VTOL aircraft position to the preferred LZ based on: 1) the at least one aircraft state input, 2) the at least one environmental input, 3) the at least one engine performance input, 4) the at least one aircraft performance input, 5) the at least one LZ suitability input, and 6) the at least one 3D world model input, the at least one path having a start point collocated with the VTOL aircraft position and a touchdown point associated with the preferred LZ, the at least one path further including at least one of: a glide segment, a glide speed, a glide angle of bank, an autorotation segment, minimal time-to-land autoland segment;
receiving an immediate landing request from one of: an operator onboard the VTOL aircraft and the vehicle health module;
commanding a damage tolerant autopilot, upon response of the immediate landing request, to employ a plurality of failure based control inputs to maneuver the VTOL aircraft using an all axis closed loop control from the start point to the touchdown point via the at least one path, the plurality of failure based control inputs based on the at least one engine performance input and the at least one aircraft performance input.

13. The method for automated VTOL aircraft emergency landing of claim 12, further comprising:
  receiving the immediate landing request from one of: a manned operator onboard the VTOL aircraft and the vehicle health module;
  directing a flight director onboard the VTOL aircraft to display, on a flight display onboard the VTOL aircraft, one of: a flight control guidance command, a collective guidance command, an autorotation command, and a power command, each command associated with the at least one path; and
  upon selection by the manned operator, command the damage tolerant autopilot to employ the plurality of failure-based control inputs to maneuver the VTOL aircraft using the all axis closed loop control from the start point to the touchdown point via the at least one path.

14. The method for automated VTOL aircraft emergency landing of claim 12, wherein continuously determining and updating, a preferred LZ from the at least one acceptable LZ based on the threat level associated with each of the at least one acceptable LZ further comprises;
  determining each of the at least one acceptable LZ are within a high threat level area;
  determining a hierarchy of the at least one acceptable LZ based on the threat level associated with each of the at least one acceptable LZ; and
  selecting a lowest threat LZ from the hierarchy as the preferred LZ.

15. The method for automated VTOL aircraft emergency landing of claim 13, wherein the plurality of failure based control inputs to maneuver the VTOL aircraft further comprises one of: an autonomous autorotation entry, an autonomous glide, an autonomous minimal time-to-land autoland, and an autonomous flare to the touchdown point with no action from the manned operator.

* * * * *